(12) United States Patent
Matsumoto et al.

(10) Patent No.: US 9,869,918 B2
(45) Date of Patent: Jan. 16, 2018

(54) ELECTROCHROMIC APPARATUS, ELECTROCHROMIC ELEMENT, AND METHOD OF MANUFACTURING ELECTROCHROMIC ELEMENT

(71) Applicants: Takahiko Matsumoto, Kanagawa (JP); Keiichiroh Yutani, Kanagawa (JP); Hidekazu Yaginuma, Kanagawa (JP); Koh Fujimura, Tokyo (JP); Fuminari Kaneko, Kanagawa (JP); Mamiko Inoue, Tokyo (JP); Sukchan Kim, Kanagawa (JP); Satoshi Yamamoto, Kanagawa (JP); Tohru Yashiro, Kanagawa (JP)

(72) Inventors: Takahiko Matsumoto, Kanagawa (JP); Keiichiroh Yutani, Kanagawa (JP); Hidekazu Yaginuma, Kanagawa (JP); Koh Fujimura, Tokyo (JP); Fuminari Kaneko, Kanagawa (JP); Mamiko Inoue, Tokyo (JP); Sukchan Kim, Kanagawa (JP); Satoshi Yamamoto, Kanagawa (JP); Tohru Yashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/988,992

(22) Filed: Jan. 6, 2016

(65) Prior Publication Data
US 2016/0209721 A1 Jul. 21, 2016

(30) Foreign Application Priority Data

Jan. 16, 2015 (JP) .................................. 2015-006598
Jan. 20, 2015 (JP) .................................. 2015-008601

(51) Int. Cl.
*G02F 1/155* (2006.01)
*G02F 1/1343* (2006.01)

(52) U.S. Cl.
CPC .......... *G02F 1/155* (2013.01); *G02F 1/13439* (2013.01); *G02F 2001/1552* (2013.01)

(58) Field of Classification Search
CPC ................. G02F 1/155; G02F 1/13439; G02F 2001/1552; H01L 51/5212; E06B 3/6722
(Continued)

(56) References Cited

U.S. PATENT DOCUMENTS 5,169,693 A 12/1992 Fujimura
5,184,239 A 2/1993 Sano et al.
(Continued)

FOREIGN PATENT DOCUMENTS

JP 57-040286 3/1982
JP 63-158528 7/1988
(Continued)

OTHER PUBLICATIONS

Extended European Search Report dated May 27, 2016 in Patent Application No. 16150329.7.
(Continued)

*Primary Examiner* — Tuyen Tra
(74) *Attorney, Agent, or Firm* — Oblon, McClelland, Maier & Neustadt, L.L.P.

(57) ABSTRACT

An electrochromic apparatus including a first support, a first electrode, a first transparent conductive layer, an electrochromic layer, a second support, a second electrode, a second transparent conductive layer, and an electrolyte layer is provided. The first and second supports have first and second surfaces, respectively, on each of which a plurality of grooves is formed. The grooves on the second surface are facing the grooves on the first surface. The first and second (Continued)

electrodes are disposed at each one of the plurality of grooves of the first and second supports, respectively. The first and second transparent conductive layers are in contact with the first and second surfaces, respectively. The electrochromic layer is in contact with the first transparent conductive layer. The electrolyte layer is between the electrochromic layer and the second transparent conductive layer.

20 Claims, 2 Drawing Sheets

(58) Field of Classification Search
USPC .................................. 359/265–275; 345/105
See application file for complete search history.

(56) References Cited

U.S. PATENT DOCUMENTS

| 2006/0262377 | A1* | 11/2006 | Kojima ............... G02F 1/155 |
| | | | 359/265 |
| 2007/0216316 | A1 | 9/2007 | Hirano et al. |
| 2008/0204608 | A1 | 8/2008 | Takano et al. |
| 2009/0231663 | A1 | 9/2009 | Hirano et al. |
| 2009/0231664 | A1 | 9/2009 | Shibuya et al. |
| 2011/0222139 | A1 | 9/2011 | Naijo et al. |
| 2011/0279884 | A1 | 11/2011 | Fujimura et al. |
| 2012/0033286 | A1 | 2/2012 | Yashiro et al. |
| 2012/0050838 | A1 | 3/2012 | Hirano et al. |
| 2012/0139824 | A1 | 6/2012 | Takahashi et al. |
| 2012/0154892 | A1 | 6/2012 | Yashiro et al. |
| 2012/0194894 | A1 | 8/2012 | Yashiro et al. |
| 2013/0258439 | A1 | 10/2013 | Naijo et al. |
| 2013/0335802 | A1 | 12/2013 | Kim et al. |
| 2014/0078569 | A1 | 3/2014 | Takahashi et al. |
| 2014/0268284 | A1 | 9/2014 | Naijo et al. |
| 2015/0168796 | A1 | 6/2015 | Yashiro et al. |
| 2015/0198857 | A1 | 7/2015 | Yashiro et al. |
| 2015/0274761 | A1 | 10/2015 | Sagisaka et al. |
| 2015/0331295 | A1 | 11/2015 | Takahashi et al. |
| 2015/0378233 | A1 | 12/2015 | Fujiwara et al. |

FOREIGN PATENT DOCUMENTS

| JP | 64-090422 | 4/1989 |
| JP | 2010-014917 | 1/2010 |
| WO | WO 2011/021470 A1 | 2/2011 |

OTHER PUBLICATIONS

U.S. Appl. No. 07/953,822, filed Sep. 30, 1992.
U.S. Appl. No. 14/752,244, filed Jun. 26, 2015.

* cited by examiner

ELECTROCHROMIC APPARATUS, ELECTROCHROMIC ELEMENT, AND METHOD OF MANUFACTURING ELECTROCHROMIC ELEMENT

CROSS-REFERENCE TO RELATED APPLICATIONS

This patent application is based on and claims priority pursuant to 35 U.S.C. §119(a) to Japanese Patent Application Nos. 2015-006598 and 2015-008601, filed on Jan. 16, 2015 and Jan. 20, 2015, respectively, in the Japan Patent Office, the entire disclosure of each of which is hereby incorporated by reference herein.

BACKGROUND

Technical Field

The present disclosure relates to an electrochromic apparatus, an electrochromic element, and a method of manufacturing an electrochromic element.

Description of the Related Art

Electrochromism is a phenomenon in which color reversibly changes as a redox reaction reversibly occurs upon application of a voltage. Electrochromic apparatuses using electrochromism have been actively studied recently with expectation of various applications of electrochromism.

Electrochromic materials used for electrochromic apparatuses include both organic and inorganic materials. Organic materials, capable of developing various colors depending on the molecular structure, are promising materials for color display. Inorganic materials have some difficulties in color development control, however, they are under study with expectation of application to dimming glass and ND filter which can take advantage of low color saturation of inorganic materials.

When considering application of the electrochromic apparatus to a large-scale application, the color development-discharge speed (response speed) will disadvantageously lower because the electrochemical reaction takes a lot of time. On the other hand, the electrochromic apparatus typically uses a transparent conductive film, such as indium tin oxide (ITO) film, as an electrode. There has been an attempt to laminate multiple ITO films to suppress such a lowering of the responsive speed.

To more suppress lowering of the responsive speed, the laminated ITO films should be much thicker. However, increase of the film thickness adversely lowers light transmittance (transparency). It is very difficult to achieve a good balance between low resistance and high transparency since they are contradictory characteristics.

SUMMARY

In accordance with some embodiments of the present invention, an electrochromic apparatus is provided. The electrochromic apparatus includes a first support, a first electrode, a first transparent conductive layer, an electrochromic layer, a second support, a second electrode, a second transparent conductive layer, and an electrolyte layer. The first support has a first surface on which a plurality of grooves is formed. The first electrode is disposed at each one of the plurality of grooves of the first support. The first transparent conductive layer is in contact with the first surface of the first support having the first electrode thereon. The electrochromic layer is in contact with the first transparent conductive layer. The second support has a second surface on which a plurality of grooves is formed, and the grooves on the second surface are facing the grooves on the first surface. The second electrode is disposed at each one of the plurality of grooves of the second support. The second transparent conductive layer is in contact with the second surface of the second support having the second electrode thereon. The electrolyte layer is between the electrochromic layer and the second transparent conductive layer.

In accordance with some embodiments of the present invention, an electrochromic element is provided. The electrochromic element includes a first support, a first electrode layer, a second support, a second electrode layer, an electrolyte layer, an electrochromic layer, and a first auxiliary electrode. The first electrode layer is on the first support. The second electrode layer is on the second support and facing the first electrode layer. The electrolyte layer is between the first electrode layer and the second electrode layer. The electrochromic layer is in contact with the first electrode layer. The first auxiliary electrode is in contact with the first electrode layer and embedded in the first support while forming a flat surface with the first support. The first auxiliary electrode includes a material having a resistance lower than that of the first electrode layer.

In accordance with some embodiments of the present invention, an electrochromic dimming member is provided. The electrochromic dimming member includes the above electrochromic element.

In accordance with some embodiments of the present invention, a method of manufacturing an electrochromic element is provided. In the method, a plurality of recesses is formed on at least one of a first surface of a first support and a second surface of a second support, which are facing with each other; an auxiliary electrode is formed at each one of the recesses; and the first surface or the second surface having the auxiliary electrode on which an electrochromic layer is formed is flattened.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

In accordance with some embodiments of the present invention, an electrochromic apparatus is provided which: suppresses deterioration in visibility caused by thickening of electrodes; achieves a good combination of low resistance and high transparency; and provides excellent adhesion between supports and electrodes.

In accordance with some embodiments of the present invention, an electrochromic element which provides excellent response speed without causing color development unevenness is provided.

EMBODIMENT A

An electrochromic apparatus according to an embodiment of the present invention includes: a first support having a first surface on which a plurality of grooves is formed; a first electrode disposed at each one of the plurality of grooves of the first support; a first transparent conductive layer in contact with the first surface of the first support having the first electrode thereon; an electrochromic layer in contact with the first transparent conductive layer; a second support having a second surface on which a plurality of grooves is formed, the grooves on the second surface facing the grooves on the first surface; a second electrode disposed at each one of the plurality of grooves of the second support; a second transparent conductive layer in contact with the second surface of the second support having the second electrode thereon; and an electrolyte layer between the electrochromic layer and the second transparent conductive layer.

Figure 1:
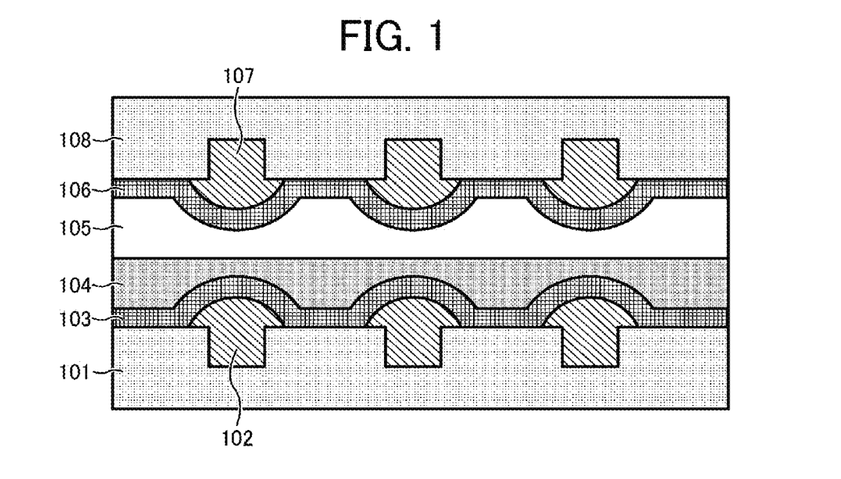
FIG. 1 is a schematic cross-sectional view of an electrochromic apparatus according to an embodiment of the present invention.

An electrochromic apparatus according to an embodiment of the present invention is described below with reference to FIG. 1. FIG. 1 is a cross-sectional schematic view of an electrochromic apparatus according to an embodiment of the present invention. The electrochromic apparatus includes a first support 101, a first electrode 102, a first transparent conductive layer 103, an electrochromic layer 104, an electrolyte layer 105, a second transparent conductive layer 106, a second electrode 107, and a second support 108.

On one surface of each of the first support 101 and the second support 108, grooves are formed. At the grooves on the first support 101 and the second support 108, the first electrode 102 and the second electrode 107 are formed, respectively.

First Support and Second Support

The first support 101 and the second support 108 may be composed of glass or a transparent resin.

Specific examples of the transparent resin include, but are not limited to, polycarbonate resin, acrylic resin, polyethylene, polyvinyl chloride, polyester, epoxy resin, melamine resin, phenol resin, polyurethane resin, and polyimide resin.

In the case in which the electrochromic apparatus is a reflective display device, one of the first support 101 and the second support 108 needs not have transparency.

Preferably, each of the first support 101 and the second support 108 is composed of a transparent resin film. Such a support composed of a transparent resin film provides higher adhesion to electrodes, thus providing a flexible electrochromic device capable of bending.

The first support 101 and the second support 108 may have a surface coating such as a transparent insulating layer or an antireflection layer, for improving vapor barrier property, gas barrier property, and visibility.

The first support 101 and the second support 108 are not limited in thickness. When the first support 101 and the second support 108 are composed of glass, the thicknesses thereof are generally in the range of 0.01 to 10 mm, and preferably in the range of 0.5 to 2.0 mm. When the first support 101 and the second support 108 are composed of transparent resin films, the thicknesses thereof are generally in the range of 0.01 to 0.3 mm, and preferably in the range of 0.05 to 0.1 mm.

The first support 101 and the second support 108 may be composed of either a same material or different materials.

Grooves

On one surface of each of the first support 101 and the second support 108, multiple grooves are formed. At the grooves on the first support 101 and the second support 108, the first electrode 102 and the second electrode 107 are formed, respectively.

Forming the electrodes on the supports improves color development-discharge response speed. Forming the electrodes at the grooves suppresses thickening of the electrode in width. Thus, visibility and transparency of the electrodes can be improved.

The grooves may be formed on the surfaces of the supports by means of laser, photolithographic etching process, or microfabrication by stamper.

The grooves are not limited in shape. According to some embodiments, the grooves have: a width in the range of 1 to 100 µm, preferably 5 to 50 µm; a depth in the range of 0.1 to 100 µm, preferably 0.5 to 10 µm; and a pitch in the range of 100 to 50,000 µm, preferably 500 to 5,000 µm. Preferably, the grooves are in a linear pattern or a grid pattern. The grooves on the first support 101 and the grooves on the second support 108 may be either the same or different in terms of shape, pitch, and/or number.

First Electrode and Second Electrode

The first electrode 102 and the second electrode 107 may be composed of silver paste, copper paste, silver ink, copper ink, or a low-resistance metal (e.g., gold, silver, copper, aluminum, nickel, tin), which have excellent electric conductivity. The first electrode 102 and the second electrode 107 may be composed of either a same material or different materials.

The first electrode 102 and the second electrode 107 are not limited in volume resistivity since the volume resistivity varies depending on the materials in use. Preferably, the first electrode 102 has a volume resistivity smaller than that of the first transparent conductive layer 103, and the second electrode 107 has a volume resistivity smaller than that of the second transparent conductive layer 106. In this case, the color development-discharge response speed can be improved.

The electrodes may be prepared by: various printing methods (e.g., screen printing, gravure offset printing, inkjet printing); a method which forms the electrodes by means of sputtering, vapor deposition, or ion plating, only on desired portions while masking non-electron portions; or a method which forms the electrodes by means of electrolytic plating or electroless plating after a seed layer is patterned at the grooves.

In the case in which electroless plating is employed, the seed layer is composed of a material capable of acting as a catalyst in the electroless plating. Such a material is selected in accordance with the type of metal to be deposited by the electroless plating and the property of a plating liquid in use. Specific examples of such a material include, but are not limited to, fine particles of a metal oxide hydrate such as $PdTiO_3 \cdot 6H_2O$ and fine particles of a Pd-carrying metal oxide such as titanium oxide. In the case in which electrolytic plating is employed, the seed layer is composed of a material capable of having electrical continuity. Specific examples of such a material include, but are not limited to, silver paste, copper paste, silver ink, copper ink, and indium tin oxide (ITO).

The surface of the first support 101 facing the electrochromic layer 104, on which the first electrode 102 is formed, has an aperture ratio of 90% or more, preferably 95% or more. In this case, transparency can be improved. The aperture ratio is defined as the ratio of the area where the first electrode 102 is not formed to the whole area of the first support 101.

The same applies to the second support 108. Preferably, both the first support 101 and the second support 108 have an aperture ratio within the above-described range.

In the present embodiment, as illustrated in FIG. 1, the height of the electrode is greater than the depth of the grooves. In other words, the electrode is protruding from the grooves forming convex central parts.

The configuration illustrated in FIG. 1 is just an illustrative example, and can be modified so long as the effect of the present invention is obtained. According to another embodiment, the height of the electrode may be equal to or smaller than the depth of the grooves.

First Transparent Conductive Layer and Second Transparent Conductive Layer

The first transparent conductive layer 103 and the second transparent conductive layer 106 may be composed of an inorganic material such as ITO, FTO, and ATO. Among such materials, an inorganic material including at least one of indium oxide, tin oxide, and zinc oxide which is formed by means of vacuum film formation is preferable. Indium oxide, tin oxide, and zinc oxide are easy to form a film by sputtering and are given excellent transparency and electric conductivity. Specific preferred examples of such materials include $InSnO$, $GaZnO$, $SnO$, $In_2O_3$, $ZnO$, and $InZnO$.

Moreover, materials having a low crystallinity are preferable for improving bending resistance. In addition, a network electrode of silver, gold, copper, carbon nanotube, metal oxide, and the like, having transparency, and a composite layer thereof are also usable. The network electrode is a transmissive electrode formed by a fine network of carbon nanotube and other highly-conductive non-transmissive materials.

The first transparent conductive layer 103 and the second transparent conductive layer 106 have a thickness in the range of 10 nm to 1 µm, preferably 50 nm to 500 nm.

The first transparent conductive layer 103 and the second transparent conductive layer 106 may be composed of either a same material or different materials.

Electrochromic Layer

The electrochromic layer 104 includes an electrochromic material.

The electrochromic material may be either an inorganic electrochromic compound or an organic electrochromic compound. The electrochromic material may also be a conductive polymer showing electrochromism.

Specific examples of the inorganic electrochromic compound include, but are not limited to, tungsten oxide, molybdenum oxide, iridium oxide, and titanium oxide.

Specific examples of the organic electrochromic compound include, but are not limited to, viologen, rare-earth phthalocyanine, and styryl.

Specific examples of the conductive polymer include, but are not limited to, polypyrrole, polythiophene, polyaniline, and derivatives thereof.

The electrochromic layer 104 preferably has such a configuration that conductive or semiconductive particles are carrying an organic electrochromic compound. More specifically, the electrochromic layer 104 preferably has a configuration of an electrode, the surface of which is sintered with fine particles having a particle diameter of about 5 to 50 nm and adsorbing an organic electrochromic compound having a polar group (e.g., phosphonate group, carboxyl group, silanol group) on their surfaces.

With such a configuration, electrons are effectively injected into the organic electrochromic compound owing to a large surface effect of the fine particles. An electrochromic display element with such a configuration is capable of responding more rapidly compared to a conventional one. In addition, by use of the fine particles, the electrochromic layer can be formed into a transparent display layer which provides high color development density of electrochromic dyes. The conductive or semiconductive particles can carry multiple types of organic electrochromic compounds. The conductive particles also provide conductivity as an electrode layer.

Specific examples of polymer-based and dye-based electrochromic compounds include, but are not limited to, low-molecular-weight organic electrochromic compounds of azobenzene type, anthraquinone type, diarylethene type, dihydroprene type, dipyridine type, styryl type, styrylspiropyran type, spirooxazine type, spirothiopyran type, thioindigo type, tetrathiafulvalene type, terephthalic acid type, triphenylmethane type, benzidine type, triphenylamine type, naphthopyran type, viologen type, pyrazoline type, phenazine type, phenylenediamine type, phenoxazine type, phenothiazine type, phthalocyanine type, fluoran type, fulgide type, benzopyran type, and metallocene type; and conductive polymer compounds such as polyaniline and polythiophene. Each of these materials can be used alone or in combination with others.

Among these materials, viologen compounds and dipyridine compounds are preferable since they show excellent color development-discharge potential and color values, and a dipyridine compound represented by the following formula (1) is more preferable.

Formula (1)

In the formula (1), each of R1 and R2 independently represents an alkyl or aryl group having 1 to 8 carbon atoms, each of which may have a substituent, with at least one of R1 and R2 has a substituent selected from $COOH$, $PO(OH)_2$, and $Si(OC_kH2_{k+1})_3$, and k represents a numeral in the range of 1 to 20.

In the formula (1), X represents a monovalent anion. The monovalent anion is not limited to a particular ion so long as it forms a stable pair with a cationic part. Specific examples of such monovalent anion include, but are not limited to, Br ion (Br$^-$), Cl ion (Cl$^-$), ClO$_4$ ion (ClO$_4^-$), PF$_6$ ion (PF$_6^-$), and BF$_4$ ion (BF$_4^-$).

In the formula (1), each of n, m, and 1 independently represents 0, 1, or 2.

In the formula (1), each of A, B, and C independently represents an alkyl, aryl, or heterocyclic group having 1 to 20 carbon atoms, each of which may have a substituent.

Specific examples of metal-complex-based and metal-oxide-based electrochromic compounds include, but are not limited to, inorganic electrochromic compounds such as titanium oxide, vanadium oxide, tungsten oxide, indium oxide, iridium oxide, nickel oxide, and Prussian Blue.

The conductive or semiconductive particles for carrying the electrochromic compound are not limited to any particular material. In particular, metal oxides are preferably used therefor.

Specifically, metal oxides composed primarily of the following compounds are preferable: titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, and calcium phosphate. Each of these materials can be used alone or in combination with others.

Form the viewpoint of electric property, such as electric conductivity, and physical property, such as optical property, at least one of titanium oxide, zinc oxide, tin oxide, zirconium oxide, iron oxide, magnesium oxide, indium oxide, and tungsten oxide is preferably used. In particular, titanium oxide and tin oxide are more preferable since they are capable of displaying colors with a high color development-discharge response speed.

The conductive or semiconductive particles are not limited in shape. Preferably, the conductive or semiconductive particles have a shape which has a large surface area per unit volume (hereinafter "specific surface area") for effectively carrying the electrochromic compound. For example, in the case in which the particles are composed of aggregate of nano particles, the particles can effectively carry the electrochromic compound owing to their large specific surface area, providing an excellent display contrast ratio between color development and discharge.

The electrochromic layer 104, or the layer of the conductive or semiconductive particles, can be formed by means of vacuum film formation or application of a particle-dispersed paste. The latter is preferable in terms of productivity.

The electrochromic layer 104 is not limited in thickness. Preferably, the electrochromic layer 104 has a thickness in the range of 0.2 to 5.0 μm. When the thickness is less than 0.2 μm, color development density may be insufficient. When the thickness is in excess of 5.0 μm, manufacturing cost may increase and visibility may decrease due to the occurrence of coloring.

Electrolyte Layer

The electrolyte layer 105 is a solid electrolyte layer formed of a light-curable or heat-curable resin film holding an electrolyte therein. Preferably, the electrolyte layer further includes an inorganic particle for controlling the layer thickness.

Preferably, the electrolyte layer is formed of a film prepared by applying a mixed solution of an inorganic particle, a curable resin, and an electrolyte to the electrochromic layer 104, and curing the applied solution by light or heat. Alternatively, the electrolyte layer may be formed of a film prepared by applying a mixed solution of a curable resin and an electrolyte to a previously-formed porous inorganic particle layer to allow the mixed solution to permeate it, and curing the applied solution by light or heat. In the case in which the electrochromic layer 104 is composed of conductive or semiconductive nano particles carrying an electrochromic compound, the electrolyte layer 105 may be formed of a film prepared by applying a mixed solution of a curable resin and an electrolyte to the electrochromic layer to allow the mixed solution to permeate it, and curing the applied solution by light or heat.

The electrolyte may be either a liquid electrolyte such as an ionic liquid, or a solution of a solid electrolyte dissolved in a solvent.

Specific materials used for the electrolyte include, but are not limited to, inorganic ion salts such as alkali metal salts and alkali-earth metal salts, quaternary ammonium salts, and supporting salts of acids and bases. More specifically, LiClO$_4$, LiBF$_4$, LiAsF$_6$, LiPF$_6$, LiCF$_3$SO$_3$, LiCF$_3$COO, KCl, NaClO$_3$, NaCl, NaBF$_4$, NaSCN, KBF$_4$, Mg(ClO$_4$)$_2$, and Mg(BF$_4$)$_2$, can be used.

All ionic liquids having been generally researched or reported can be used.

In particular, an organic ionic liquid generally has a molecular structure which shows liquidity in a wide temperature range including room temperature.

The molecular structure of the electrolyte has both a cationic component and an anionic component.

Specific examples of the cationic component include, but are not limited to, aromatic salts such as imidazole derivatives (e.g., N,N-dimethylimidazole salt, N,N-methylethylimidazole salt, N,N-methylpropylimidazole salt) and pyridinium derivatives (e.g., N,N-dimethylpyridinium salt, N,N-methylpropylpyridinium salt), and aliphatic quaternary ammonium salts such as tetraalkyl ammonium salts (e.g., trimethylpropyl ammonium salt, trimethylhexylammonium salt, triethylhexylammonium salt).

In view of stability in the atmosphere, the anionic component is preferably selected from fluorine-containing compounds such as BF$_4^-$, CF$_3$SO$_3^-$, PF$_4^-$, and (CF$_3$SO$_2$)$_2$N$^-$. Ionic liquids prepared by combining these cationic and anionic components are preferable.

Specific examples of the solvent include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, alcohols, and mixed solvents thereof.

Specific examples of the curable resin include, but are not limited to, light-curable resins such as acrylic resin, urethane resin, epoxy resin, vinyl chloride resin, ethylene resin, melamine resin, and phenol resin, and heat-curable resins. Materials having high affinity for the electrolyte are more preferable. In particular, derivatives of ethylene glycol, such as polyethylene glycol and polypropylene glycol, are preferable. As the curable resin, a light-curable resin is preferably used. In this case, an element can be produced at a lower temperature within a shorter time period, compared to a case in which a thin film is formed by thermal polymerization or solvent evaporation.

Most preferably, the electrolyte layer is composed of a solid solution of a matrix polymer containing an oxyethylene or oxypropylene chain with an ionic liquid. In this case, hardness and high ion conductivity go together.

The inorganic particle is not limited to any particular material so long as it forms a porous layer that holds the electrolyte and the curable resin. Form the viewpoint of electrochromic reaction stability and visibility, materials having high insulating property, transparency, and durability are preferably used therefor. Specific materials used for the inorganic particle include, but are not limited to, oxides and sulfates of silicon, aluminum, titanium, zinc, and tin, and mixtures thereof.

The inorganic particle is not limited in size, and preferably has an average particle diameter in the range of 10 nm to 10 μm, more preferably 10 to 100 nm.

EXAMPLES A

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLE A1

Preparation of Electrochromic Apparatus

Polyethylene terephthalate (PET) films having a size of 40 mm×40 mm and a thickness of 100 μm are prepared as the first support 101 and the second support 108. On one side of each of the PET films serving as the first support 101 and the second support 108, grooves in a linear pattern having a width of 20 μm and a depth of 3 μm are formed by a laser drawing device (available from YE Data Inc.) The wiring line pitch is 5 mm. A metal electrode wiring is formed at the groove portions with a silver paste (CA-405NL available from Daiken Chemical Co., Ltd.) using a screen plate having an aperture pattern equivalent to the linear pattern of the grooves. The resulting electrode has a cross-sectional shape as illustrated in FIG. 1.

On the electrode wiring formed on each of the first support 101 and the second support 108, an ITO film having a thickness of about 100 nm is further formed by a sputtering method, thus forming the first transparent conductive layer 103 and the second transparent conductive layer 106, respectively.

A titanium oxide nano particle dispersion liquid (SP210 available from Showa Titanium Co., Ltd.) is applied to a surface of the ITO film formed on the first support 101 by a spin coating method, thus forming a titanium oxide particle film having a thickness of about 1.0 μm composed of a nano structure semiconductive material. Further, a 1.5% (by weight) 2,2,3,3-tetrafluoropropanol solution of an electrochromic compound having the following formula (A) is applied thereto by a spin coating method to allow the titanium oxide particle film to carry (adsorb) the electrochromic compound. Thus, the electrochromic layer 104 is formed.

Formula (A)

An electrolyte liquid having the following composition is prepared, and 30 mg thereof is weighed with a micro pipette and dropped on the electrochromic layer 104.

IRGACURE 184 (available from BASF Japan Ltd.): 5 parts

PEG400DA (available from Nippon Kayaku Co., Ltd.): 100 parts

1-Ethyl-3-methylimidazolium tetracyanoborate (available from Merk KGaA): 50 parts After sticking the second support 108 having the second transparent conductive layer 106 thereon, the electrolyte liquid is exposed to an ultraviolet light (having a wavelength of 250 nm) emitted from a UV emission device (SPOT CURE available from Ushio Inc.) at 10 mW for 60 seconds to cause a curing. Thus, an electrochromic apparatus is prepared. In the resulting electrochromic apparatus, the first support 101 has an aperture ratio of 99.6%.

Evaluations

The electrochromic apparatus is subjected to the following evaluations of visibility, transparency, color development-discharge responsiveness, and adhesion.

Evaluation of Visibility

Visibility is evaluated by a subjective evaluation in which an evaluator having a visual acuity of 1.0 observes the display of the electrochromic apparatus with naked eyes from a position 30 cm apart. The evaluation is based on the following criteria.

Evaluation Criteria

A: Very good. The electrode formed at the groove portions of the support is almost not visible.

B: Good. The electrode formed at the groove portions of the support is slightly visible, but the visibility is not reduced.

C: Poor. The electrode formed at the groove portions of the support is highly visible to reduce the visibility.

Evaluation of Transparency

Transparency is evaluated by a transmittance within a wavelength range of 400 to 800 nm. The transmittance is measured by an instrument USB 4000 available from Ocean Optics, Inc. The evaluation is based on the following criteria.

Evaluation Criteria

A: Transmittance is not less than 60%.

B: Transmittance is not less than 50% and less than 60%.

C: Transmittance is less than 50%.

Evaluation of Color Development-Discharge Responsiveness

A voltage of −3 V is applied for 5 seconds to between the first electrode 102 and the second electrode 107 while making the first electrode 102 negative to cause the electrochromic apparatus to develop color. Further, a voltage of +3 V is applied for 5 seconds while making the first electrode 102 positive to cause the electrochromic apparatus to discharge the color. The responsiveness to color development and discharge is evaluated based on the following criteria.

Evaluation Criteria

A: The color development or discharge completes within 3 seconds.

B: The color development or discharge completes within 10 seconds but takes longer than 3 seconds.

C: The color development or discharge takes longer than 10 seconds.

Evaluation of Adhesion

Adhesion is evaluated by a bending test in which the electrochromic apparatus is bent along the arc of a semi-circle having a diameter of 4 mm and then stretched again. After repeating the bending and stretching 10 times, whether electrode breakage is caused or not is checked and the variation in resistance value is determined. The evaluation is based on the following criteria.

Evaluation Criteria

A: Electrode breakage is observed at few portions, and the decrease rate of resistance value is within 10%.

B: Electrode breakage is observed at few portions, and the decrease rate of resistance value is within 25%.

C: Electrode breakage is observed at many portions, and the decrease rate of resistance value is greater than 25%.

EXAMPLE A2

Another electrochromic apparatus is prepared in the same manner as Example 1 except that the grooves on the supports are formed into a grid pattern instead of the linear pattern. In this electrochromic apparatus, the first support 101 has an aperture ratio of 99.2%. This electrochromic apparatus is also subjected to the above evaluations.

COMPARATIVE EXAMPLE A1

Another electrochromic apparatus is prepared in the same manner as Example 1 except that no groove is formed on the supports. Namely, Comparative example A1 is different from Example A1 in that the metal electrode wiring is formed with the silver paste on the PET film that is flat. This electrochromic apparatus is also subjected to the above evaluations.

COMPARATIVE EXAMPLE A2

Another electrochromic apparatus is prepared in the same manner as Comparative Example A1 except that no metal electrode wiring is formed with a silver paste. This electrochromic apparatus is also subjected to the above evaluations.

The evaluation results for Examples A1 and A2 and Comparative Examples A1 and A2 are shown in Table 1. In Table 1, "-" means to be unmeasurable. In Comparative Example A2, it is difficult to evaluate visibility and transparency since no electrode wiring is formed.

TABLE 1

| | Visibility | Transparency | Color Development-Discharge Responsiveness | Adhesion |
|---|---|---|---|---|
| Example A1 | A | B | A | B |
| Example A2 | A | B | A | A |
| Comparative Example A1 | C | C | A | C |
| Comparative Example A2 | — | — | C | C |

Table 1 indicates that the color development-discharge responsiveness has improved when the electrodes are formed on the supports. In addition, Examples A1 and A2 are superior to Comparative Example A1 in terms of visibility, transparency, and adhesion.

EMBODIMENT B

Figure 2:
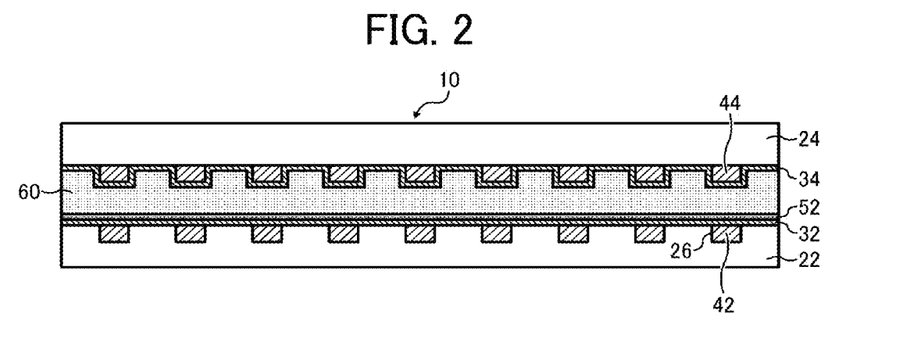
FIG. 2 is a schematic cross-sectional view of an electrochromic element according to an embodiment of the present invention.
Figure 3:
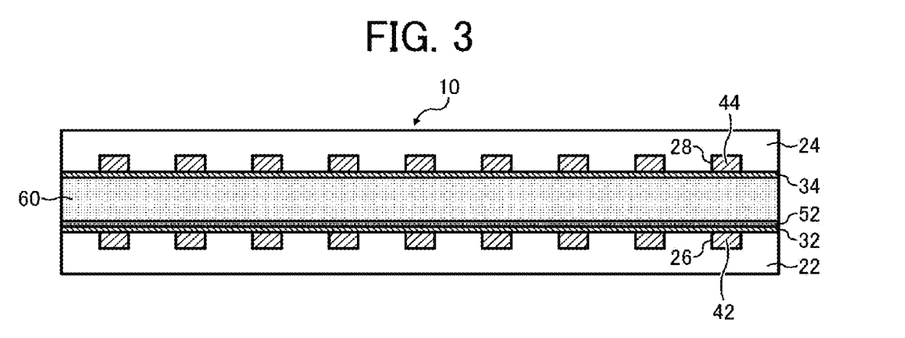
FIG. 3 is a schematic cross-sectional view of an electrochromic element according to another embodiment of the present invention.

FIG. 2 is a schematic cross-sectional view of an electrochromic element according to an embodiment of the present invention. FIG. 3 is a schematic cross-sectional view of an electrochromic element according to another embodiment of the present invention.

Referring to FIG. 2, an electrochromic element 10 includes a first support 22, grooves 26 that are continuous recesses formed on the first support 22, and a first auxiliary electrode 42 embedded in the grooves 26. The first support 22 and the first auxiliary electrode 42 are forming a flat surface. A first electrode layer 32 is formed on the surface formed with the first support 22 and the first auxiliary electrode 42, and an electrochromic layer 52 is formed on the first electrode layer 32. A second auxiliary electrode 44 is formed on a second support 24. A second electrode layer 34 is formed on a surface formed with the second support 24 and the second auxiliary electrode 44. The first electrode layer 32 on the first support 22 and the second electrode layer 34 on the second support 24 are facing with each other with an electrolyte layer 60 therebetween.

Since the surface formed with the first support 22 and the first auxiliary electrode 42 is flat, the laminated layers are uniform in film thickness. This is advantageous for the electrochromic element because color development unevenness is caused depending on the thickness of the electrochromic layer.

Referring to FIG. 3, grooves 28 are formed on the second support 24, the second auxiliary electrode 44 is embedded in the grooves 28, and a surface formed with the second support 24 and the second auxiliary electrode 44 is flat. In this embodiment, the second electrode layer 34 formed on the surface formed with the second support 24 and the second auxiliary electrode 44 is flat. Similar to the electrochromic element 10 illustrated in FIG. 2, the first electrode layer 32 on the first support 22 and the second electrode layer 34 on the second support 24 are facing with each other with the electrolyte layer 60 therebetween.

In the electrochromic element 10, the first auxiliary electrode 42, having a lower resistance than the first electrode layer 32, is formed into a pattern as being embedded in the grooves 26 of the first support 22. Compared to a case in which the first auxiliary electrode 42 and the second auxiliary electrode 44 are not provided, the electrochromic response speed can be more increased.

When the first auxiliary electrode 42 and the second auxiliary electrode 44 include a high-conductivity material such as a metal or carbon, the electrochromic response speed can be increased more effectively. When the first electrode layer 32 and the second electrode layer 34 are formed over the whole surfaces, the electrochromic layer 52 and other electrochromic layers can react each other uniformly. When the first electrode layer 32 and the second electrode layer 34 include a conductive oxide, a conductive particle, or a conductive carbon, these electrode layers achieve a good balance between conductivity and transparency and also function as protective layers for protecting the first auxiliary electrode 42 and the second auxiliary electrode 44, respectively. Thus, the electrochromic element 10 can be in its stable state for an extended period of time.

Electrochromic Element

The electrochromic element 10 according to an embodiment of the present invention includes the first and second supports 22 and 24, the first and second electrode layers 32 and 34, the auxiliary electrodes 42 and 44, the electrochromic layer 52, and the electrolyte layer 60. The electrochromic element 10 may optionally include other members, if needed.

First Support and Second Support

The first and second supports 22 and 24 are composed of a transparent material capable of supporting other layers, and have a structure capable of supporting other layers. The first and second supports 22 and 24 are not limited in shape, structure, size, and material, so long as recesses are formed on at least one of a first surface of the first support 22 and a second surface of the second support 24 having the first and second electrode layers 32 and 34 thereon, respectively, on which the electrochromic layer 52 is formed.

The first and second supports 22 and 24 are not limited in shape, and may have a platy shape or a curved shape.

With respect to the structure, recesses are formed on at least one of a first surface of the first support 22 and a second surface of the second support 24 having the first and second electrode layers 32 and 34 thereon, respectively, on which the electrochromic layer 52 is formed.

The recesses are not limited in depth, pitch, and process of formation so long as multiple recesses are formed on the first and second supports 22 and/or 24 and the auxiliary electrodes 42 and/or 44 are to be embedded in the recesses.

The width of the recesses is preferably in the range of 5 to 50 µm so as not to drastically reduce the aperture ratio of the support due to the embedment of the auxiliary electrode.

The depth of the recesses is preferably in the range of 0.5 to 10 µm.

The pitch of the recesses is preferably in the range of 100 to 50,000 µm, and more preferably 500 to 5,000 µm.

The recesses may be formed by means of laser, photolithographic etching process, or microfabrication by stamper.

The recesses may be in the form of grooves, the width of which in the short direction is coincident with the width of the recesses.

The grooves may be in a linear pattern or a grid pattern, which are easy to form, but are not limited thereto.

The first and second supports 22 and 24 are not limited in size.

The first and second supports 22 and 24 are not limited in material so long as they are transparent. Specific materials usable for the first and second supports 22 and 24 include both organic and inorganic materials, such as glass substrates (e.g., alkali-free glass, borosilicate glass, float glass, soda-lime glass) and resin substrates (e.g., polycarbonate resin, acrylic resin, polyethylene, polyvinyl chloride, polyester, epoxy resin, melamine resin, phenol resin, polyurethane resin, polyimide resin), but are not limited thereto.

The first and second supports 22 and 24 may have a surface coating such as a transparent insulating layer, a UV cut layer, or an antireflection layer, for improving vapor barrier property, gas barrier property, ultraviolet resistance, and visibility.

First Electrode Layer and Second Electrode Layer

The first electrode layer 32 and the second electrode layer 34 are not limited in material, and may be composed of an inorganic material such as tin-doped indium oxide (ITO), fluorine-doped tin oxide (FTO), antimony-doped tin oxide (ATO), and zinc oxide. In particular, InSnO, GaZnO, SnO, $In_2O_3$, and ZnO, are preferable.

Alternatively, a conductivity-improved transparent electrode, formed by a fine network of transparent carbon nanotube and other highly-conductive non-transmissive materials such as Au, Ag, Pt, and Cu, may be used.

The thicknesses of the first electrode layer 32 and the second electrode layer 34 are so adjusted that these electrode layers have proper electric resistance values required for causing a redox reaction in the electrochromic layer 52.

When the first electrode layer 32 and the second electrode layer 34 are composed of ITO, the thicknesses thereof are preferably in the range of 50 to 500 nm.

The first electrode layer 32 and the second electrode layer 34 can be formed by vacuum vapor deposition method, sputtering method, ion plating method, or the like method.

In particular, the first electrode layer 32 and the second electrode layer 34 can be formed by any application method such as spin coating method, casting method, micro gravure coating method, gravure coating method, bar coating method, roll coating method, wire bar coating method, dip coating method, slit coating method, capillary coating method, spray coating method, nozzle coating method, and various printing methods, such as gravure printing method, screen printing method, flexo printing method, offset printing method, reverse printing method, and inkjet printing method.

First Auxiliary Electrode and Second Auxiliary Electrode

The first auxiliary electrode 42 and the second auxiliary electrode 44 are not limited in material and formation process, so long as the first auxiliary electrode 42, having the first electrode layer 32 and the electrochromic layer 52 thereon, is embedded in the first support 22 while forming (or sharing) a flat surface with the first support 22. Similarly, it is possible that the second auxiliary electrode 44, having the second electrode layer 34 thereon without the electrochromic layer 52, is embedded in the second support 24 while forming (or sharing) a flat surface with the second support 24.

The average difference in level between the surface of the first auxiliary electrode 42 and the first support 22, having the first electrode layer 32 and the electrochromic layer 52 thereon, is preferably 50 nm or less. When the average difference in level is 50 nm or less, the electrochromic layer 52 becomes uniform.

The first and second auxiliary electrodes 42 and 44 may be composed of, for example, silver paste, copper paste, silver ink, copper ink, a low-resistance metal (e.g., gold, silver, copper, aluminum, nickel, tin), or carbon nanotube, which have excellent electric conductivity.

The average width of each of the first and second auxiliary electrodes 42 and 44 is preferably in the range of 5 to 50 µm so as not to drastically reduce the aperture ratio of the support. When the average width of the auxiliary electrode is 5 µm or more, the electrochromic element is improved in responsiveness. When the average width of the auxiliary electrode is 50 µm or less, the electrochromic element is suppressed from visibility deterioration.

The average thickness of each of the first and second auxiliary electrodes 42 and 44 is preferably in the range of 0.5 to 10 µm from the viewpoint of responsiveness of the electrochromic element. When the average thickness of the auxiliary electrode is 0.5 µm or more, the electrochromic element is improved in responsiveness. When the average thickness of the auxiliary electrode is 10 µm or less, the thickness of the electrochromic element can be minimized.

The process of forming the auxiliary electrodes is not limited to a particular method so long as they are formed at the recesses or grooves on the supports. For example, the auxiliary electrodes may be prepared by: various printing methods (e.g., screen printing, gravure offset printing, inkjet printing); a method which forms the electrodes by means of sputtering, vapor deposition, or ion plating, only on desired portions while masking non-electron portions; or a method which forms the electrodes by means of electrolytic plating or electroless plating after a seed layer is patterned in the recesses or grooves. In the case in which electroless plating is employed, the seed layer is composed of a material capable of acting as a catalyst in the electroless plating. Such a material is selected in accordance with the type of metal to be deposited by the electroless plating and the property of a plating liquid in use. Specific examples of such a material include, but are not limited to, fine particles of a metal oxide hydrate such as $PdTiO_3 \cdot 6H_2O$ and fine particles of a Pd-carrying metal oxide such as titanium oxide. In the case in which electrolytic plating is employed, the seed layer is composed of a material capable of having electrical continuity. Specific examples of such a material include, but are not limited to, silver paste, copper paste, silver ink, copper ink, and indium tin oxide (ITO).

The aperture ratio of the support having the auxiliary electrode thereon is preferably 90% or more, and more preferably 95% or more.

The process of flattening the surface of the support in which the auxiliary electrode is embedded is not limited to a particular method. One possible method includes forming a film of the auxiliary electrode materials on the support having the patterned recesses or grooves, and polishing the support using a flat surface polisher, to flatten the surfaces of both the auxiliary electrode and the support. The process of forming the film of the auxiliary electrode materials is not limited to a particular method so long as the patterned recesses or grooves are filled with the auxiliary electrode materials. For example, the above-described method of forming the auxiliary electrode may be employed.

Alternatively, it is possible to flatten the auxiliary electrode and the surface of the support by, first, forming the auxiliary electrode in convex patterns on a flat surface of another support, filling it with the softened or melted support in which the auxiliary electrode is to be embedded, hardening the softened or melted support, and separating the hardened support from the other support with the auxiliary electrode embedded therein. The process of patterning the auxiliary electrode is not limited to a particular method, and the above-described method of forming the auxiliary electrode may be employed.

Electrochromic Layer

The electrochromic layer 52 is equivalent to the electrochromic layer 104 described in Embodiment A.

Electrolyte Layer

The electrolyte layer 60 is equivalent to the electrolyte layer 105 described in Embodiment A.

Other Members

The electrochromic element 10 may further include an insulating porous layer, an anti-deterioration layer, a protective layer, or the like.

Insulating Porous Layer

The insulating porous layer has functions of both electrically insulating the first electrode layer 32 and the second electrode layer 34 from each other and holding an electrolyte. The insulating porous layer is not limited to any particular material so long as it is porous. Porous organic, inorganic, or organic-inorganic composite material having high insulation property, durability, and film-formation property are preferably used.

The insulating porous layer can be formed by the following methods: sintering method in that polymer fine particles or inorganic particles are partially fused with each other via a binder to form pores between the particles; extraction method in that solvent-soluble organic or inorganic substances and solvent-insoluble binders are formed into a layered structure, and the organic or inorganic substances are dissolved with a solvent to form pores; foaming method; phase inversion method in that a mixture of polymers is subjected to phase separation by handling a good solvent and a poor solvent; and radiation irradiation method in that pores are formed by means of radiation.

Anti-Deterioration Layer

The anti-deterioration layer has a function of causing a reverse chemical reaction with respect to a reaction caused in the electrochromic layer to balance the charges therein. Thus, the first electrode layer 32 and the second electrode layer 34 are prevented from being corroded or deteriorated by an irreversible redox reaction. The reverse reaction of the anti-deterioration layer includes both a redox reaction and an action thereof as a capacitor.

The anti-deterioration layer is not limited in material so long as it can prevent the first electrode layer 32 and the second electrode layer 34 from being corroded by an irreversible redox reaction. Specific materials usable for the anti-deterioration layer include, but are not limited to, antimony oxide, nickel oxide, titanium oxide, zinc oxide, tin oxide, and conductive or semiconductive metal oxides containing two or more of these materials.

The anti-deterioration layer may be composed of a porous thin film which does not inhibit injection of an electrolyte. Such a porous thin film providing excellent electrolyte permeability while functioning as the anti-deterioration layer can be obtained by, for example, fixing fine particles of conductive or semiconductive metal oxides, such as antimony-tin oxide, nickel oxide, titanium oxide, zinc oxide, and tin oxide, on a second electrode with a binder of acrylic type, alkyd type, isocyanate type, urethane type, epoxy type, phenol type, or the like.

Protective Layer

The protective layer has functions of protecting the electrochromic element from external stress and chemicals used in the washing process, preventing the electrolyte from leaking, and preventing the electrochromic element from being intruded by unnecessary substances, such as moisture and oxygen in the air, to keep stable operation of the element.

The thickness of the protective layer is preferably in the range of 1 to 200 μm.

The protective layer may include an ultraviolet-curable or heat-curable resin such as acrylic resin, urethane resin, and epoxy resin.

Use Application

The electrochromic element according to an embodiment of the present invention can be used for, for example, large-size displays such as electrochromic display and stock price display, dimming elements such as anti-dazzle mirror and dimming glass, low-voltage driving elements such as touch-panel-type key switch, optical switch, optical memory, electronic paper, and electronic album.

Electrochromic Dimming Member

An electrochromic dimming member according to an embodiment of the present invention includes the electrochromic element described above and other optional members. The electrochromic dimming member can be preferably used for, for example, a pair of dimming eye glasses, a dimming glass, and an anti-dazzling mirror.

EXAMPLES B

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLE B1

The electrochromic element illustrated in FIG. 3 is prepared and evaluated as follows. Formation of First Auxiliary Electrode and First Electrode Layer on First Support As the first support 22, a glass substrate (40 mm×40 mm×0.7 mm) is prepared.

On a surface of the first support 22, grooves having a width of 20 μm, a depth of 3 μm, and a pitch of 5 mm are formed into a cross grid pattern. On the surface of the first support 22 having the grooves in a cross grid pattern, a gold film is formed by a sputtering method, and then a copper film is formed thereon by an electrolytic plating method until the grooves are filled with copper. The copper-plated first support 22 is subjected to a polishing treatment by a surface polisher. Thus, the copper, serving as the first auxiliary electrode 42, is embedded in the first support 22 while forming a flat surface with the first support 22.

On the flat surface of the first support 22 in which the first auxiliary electrode 42 is embedded, an ITO film having a thickness of about 100 nm is formed by a sputtering method to form the first electrode layer 32. Thus, a first laminated body is prepared.

Formation of Second Auxiliary Electrode and Second Electrode Layer on Second Support

As the second support 22, a glass substrate (40 mm×40 mm×0.7 mm) is prepared.

On a surface of the second support 24, grooves having a width of 20 μm, a depth of 3 μm, and a pitch of 5 mm are formed into a cross grid pattern. On the surface of the second support 24 having the grooves in a cross grid pattern, a gold film is formed by a sputtering method, and then a copper film is formed thereon by an electrolytic plating method until the grooves are filled with copper. The copper-plated second support 24 is subjected to a polishing treatment by a surface polisher. Thus, the copper, serving as the second auxiliary electrode 44, is embedded in the second support 24 while forming a flat surface with the second support 24.

On the flat surface of the second support 24 in which the second auxiliary electrode 44 is embedded, an ITO film having a thickness of about 100 nm is formed by a sputtering method to form the second electrode layer 34. Thus, a second laminated body is prepared.

Formation of Electrochromic Layer

A titanium oxide nano particle dispersion liquid (SP210 available from Showa Titanium Co., Ltd., having an average particle diameter of 20 nm) is applied to the first electrode layer 32 of the first laminated body by a spin coating method, and subjected to an annealing treatment at 120° C. for 15 minutes. Thus, a nano structure semiconductive material composed of a titanium oxide particle film having a thickness of about 1.0 μm is prepared. Further, a 1.5% (by weight) 2,2,3,3-tetrafluoropropanol solution of an electrochromic compound having the following formula (A) is applied to the nano structure semiconductive material by a spin coating method, and subjected to an annealing treatment at 120° C. for 10 minutes, to allow the titanium oxide particle film to carry (adsorb) the electrochromic compound. Thus, the electrochromic layer 52 is formed.

Formula (A)

Formation of Electrolyte Layer and Preparation of Electrochromic Element

An electrolyte liquid having the following composition is prepared.

IRGACURE 184 (available from BASF Japan Ltd.): 5 parts

PEG400DA (available from Nippon Kayaku Co., Ltd.): 100 parts

1-Ethyl-3-methylimidazolium tetracyanoborate (available from Merk KGaA): 50 parts The electrolyte liquid in an amount of 30 mg is weighed with a micro pipette and dropped on the electrochromic layer 52 on the first laminated body. The second laminated body is stuck thereon to prepare a stuck element.

The stuck element is exposed to an ultraviolet light (having a wavelength of 250 nm) emitted from a UV emission device (SPOT CURE available from Ushio Inc.) at 10 mW for 60 seconds. Thus, an electrochromic element is prepared.

Measurement of Average Difference in Level

The difference in level between the surface of the first support 22 and the surface of the first auxiliary electrode 42 is measured by a stylus step profiler (Alpha Step IQ from Yamato Scientific Co., Ltd.) at 10 randomly-selected portions, and the average difference in level is determined. In the measured difference in level, noise has been corrected.

Evaluation of Responsiveness

A voltage of −3 V is applied for 5 seconds to between the first electrode layer 32 and the second electrode layer 34 while making the first electrode layer 32 negative to cause the electrochromic element to develop color. Further, a voltage of +3 V is applied for 5 seconds while making the first electrode layer 32 positive to cause the electrochromic apparatus to discharge the color. The responsiveness to color development and discharge is evaluated based on the following criteria.

Evaluation Criteria

A: The color development or discharge completes within 2 seconds.

B: The color development or discharge completes within 5 seconds but takes longer than 2 seconds.

C: The color development or discharge takes longer than 5 seconds.

Evaluation of Transparency

Transparency of the electrochromic element in a color discharging state is evaluated in terms of visibility and transmittance based on the following criteria.

Evaluation of Visibility

Evaluation Criteria

A: The auxiliary electrode is invisible from a position 30 cm away.

B: The auxiliary electrode is almost invisible from a position 30 cm away.

C: The auxiliary electrode is highly visible from a position 30 cm away.

Evaluation of Transmittance

The average transmittance within a wavelength range of 400 to 800 nm is measured and evaluated based on the following criteria. The transmittance is measured by an instrument USB 4000 available from Ocean Optics, Inc.

Evaluation Criteria

A: The average transmittance is not less than 60%.

B: The average transmittance is not less than 50% and less than 60%.

C: The average transmittance is less than 50%.

Evaluation of Color Development Unevenness

The degree of color development unevenness of the electrochromic element in a color developing state is visually observed and evaluated based on the following criteria.

Evaluation Criteria

A: The color development unevenness is unobservable from a position 30 cm away.

B: The color development unevenness is almost unobservable from a position 30 cm away.

C: The color development unevenness is clearly observable from a position 30 cm away.

EXAMPLE B2

An electrochromic display element is prepared in the same manner as Example B1 except for changing the width, depth, and pitch of the grooves in a cross grid pattern formed on the first support 22 to 5 µm, 0.5 µm, and 5 mm, respectively, and changing the width, thickness, and pitch of the first auxiliary electrode 42 to 5 µm, 0.5 µm, and 5 mm, respectively.

EXAMPLE B3

An electrochromic display element is prepared in the same manner as Example B1 except for changing the width, depth, and pitch of the grooves in a cross grid pattern formed on the first support 22 to 5 µm, 10 µm, and 5 mm, respectively, and changing the width, thickness, and pitch of the first auxiliary electrode 42 to 5 µm, 10 µm, and 5 mm, respectively.

EXAMPLE B4

An electrochromic display element is prepared in the same manner as Example B1 except for changing the width, depth, and pitch of the grooves in a cross grid pattern formed on the first support 22 to 50 µm, 0.5 µm, and 5 mm, respectively, and changing the width, thickness, and pitch of the first auxiliary electrode 42 to 50 µm, 0.5 µm, and 5 mm, respectively.

EXAMPLE B5

An electrochromic display element is prepared in the same manner as Example B1 except for changing the width, depth, and pitch of the grooves in a cross grid pattern formed on the first support 22 to 50 µm, 10 µm, and 5 mm, respectively, and changing the width, thickness, and pitch of the first auxiliary electrode 42 to 50 µm, 10 µm, and 5 mm, respectively.

COMPARATIVE EXAMPLE B1

Figure 4A:
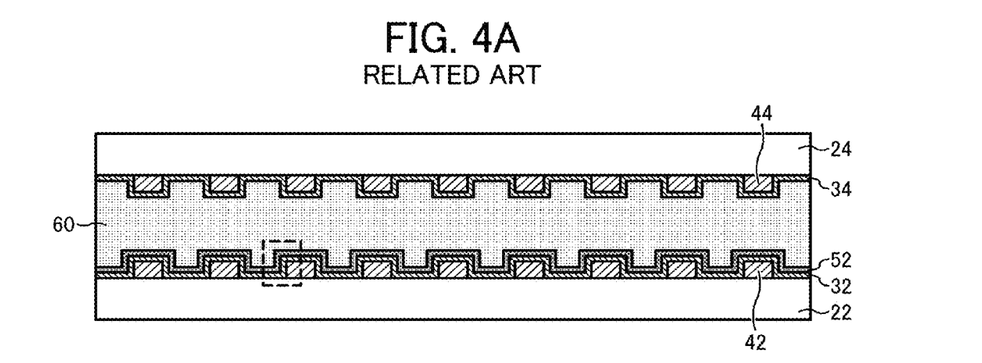
FIG. 4A is a schematic cross-sectional view of a related-art electrochromic element.

An electrochromic element illustrated in FIG. 4A is prepared and evaluated in the same manner as Example B1.
Formation of Auxiliary Electrode and Electrode Layer on Support As the first support 22, a glass substrate (40 mm×40 mm×0.7 mm) is prepared.

On the surface of the first support 22, an ITO film is formed by a sputtering method while masking a non-auxiliary electrode portion on which no auxiliary electrode is to be formed. After removing the mask, a copper film is formed thereon in a cross-grid pattern having a width of 20 µm, a line thickness of 3 µm, and a pitch of 5 mm by an electrolytic plating method, to form the first auxiliary electrode 42.

On the first support 22 having the first auxiliary electrode 42 thereon, an ITO film having a thickness of about 100 nm is formed by a sputtering method to form the first electrode layer 32.

The second support 24, the second auxiliary electrode 44, and the second electrode layer 34 are also prepared in the same manner.
Formation of Electrochromic Layer The electrochromic layer 52 is formed in the same manner as Example B1 except for replacing the spin coating method with a dip coating method.

COMPARATIVE EXAMPLE B2

Another electrochromic element illustrated in FIG. 4A is prepared in the same manner as Comparative Example B1 except for changing the width and line thickness of each of the first auxiliary electrode 42 and the second auxiliary electrode 44 to 60 µm and 0.3 µm, respectively, and is evaluated in the same manner as Example B1.

COMPARATIVE EXAMPLE B3

Another electrochromic element illustrated in FIG. 4A is prepared in the same manner as Comparative Example B1 except for changing the width and line thickness of each of the first auxiliary electrode 42 and the second auxiliary electrode 44 to 2 µm and 0.3 µm, respectively, and is evaluated in the same manner as Example B1.

COMPARATIVE EXAMPLE B4

Figure 5:
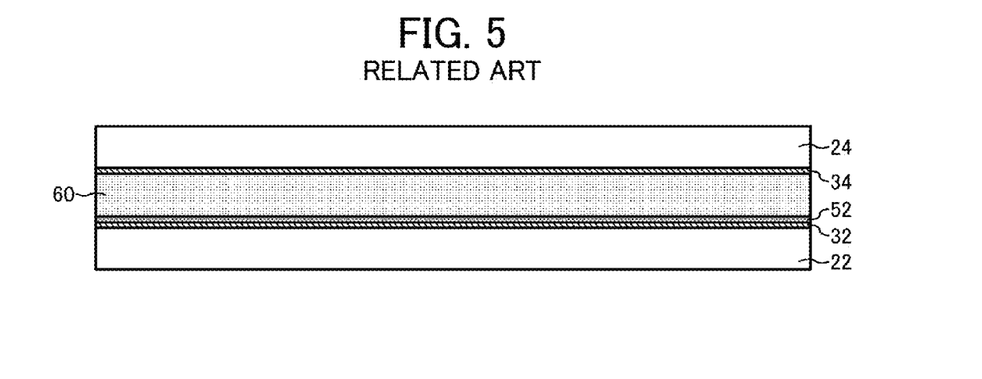
FIG. 5 is a schematic cross-sectional view of another related-art electrochromic element.

An electrochromic element illustrated in FIG. 5 is prepared and evaluated in the same manner as Example B1.
Formation of Electrode Layer on Support As the first support 22, a glass substrate (40 mm×40 mm×0.7 mm) is prepared. On the first support 22, an ITO film having a thickness of about 100 nm is formed by a sputtering method to form the first electrode layer 32 without forming a first auxiliary electrode. The second support 24 and the second electrode layer 34 are also prepared in the same manner.

The succeeding procedure is same as that of the Example B1.

The evaluation results of Examples B1 to B5 and Comparative Examples B1 to B4 with respect to responsiveness, transparency, and color development unevenness are shown in Table 2. It is confirmed that the average difference in level between the surface of the first support 22 and the surface of the first auxiliary electrode 42 is 50 nm or less in all the Examples B1 to B5 and the variation thereof is 0±3 nm.

With respect to Comparative Examples B1 to B3, the measurement of the difference in level is omitted since the surface of the first support 22 having the first auxiliary electrode 42 thereon is not flat. With respect to Comparative Example B4, the measurement of the difference in level is omitted since no auxiliary electrode is formed.

TABLE 2

|  | Responsiveness | | Transparency | | Color Development Unevenness | Auxiliary Electrode Wiring | | |
|---|---|---|---|---|---|---|---|---|
|  | Color Development | Color Discharge | Visibility | Transmittance |  | Width (µm) | Thickness (µm) | Material |
| Ex. B1 | A | A | A | A | A | 20 | 3 | Copper |
| Ex. B2 | B | B | A | A | A | 5 | 0.5 | Copper |
| Ex. B3 | A | A | A | A | A | 5 | 10 | Copper |

TABLE 2-continued

| | Responsiveness | | | | Color | Auxiliary Electrode Wiring | | |
| --- | --- | --- | --- | --- | --- | --- | --- | --- |
| | Color | Color | Transparency | | Development | Width | Thickness | |
| | Development | Discharge | Visibility | Transmittance | Unevenness | (μm) | (μm) | Material |
| Ex. B4 | A | A | B | A | A | 50 | 0.5 | Copper |
| Ex. B5 | A | A | B | A | A | 50 | 10 | Copper |
| Comp. Ex. B1 | A | A | A | A | C | 20 | 3 | Copper |
| Comp. Ex. B2 | B | B | C | A | B | 60 | 0.3 | Copper |
| Comp. Ex. B3 | C | C | A | A | B | 2 | 0.3 | Copper |
| Comp. Ex. B4 | C | C | A | A | A | — | — | — |

It is clear from Table 2 that Examples B1 to B5 are never ranked "C" in all the evaluation items, thus providing electrochromic elements which provide excellent response speed without causing color development unevenness.

Figure 4B:
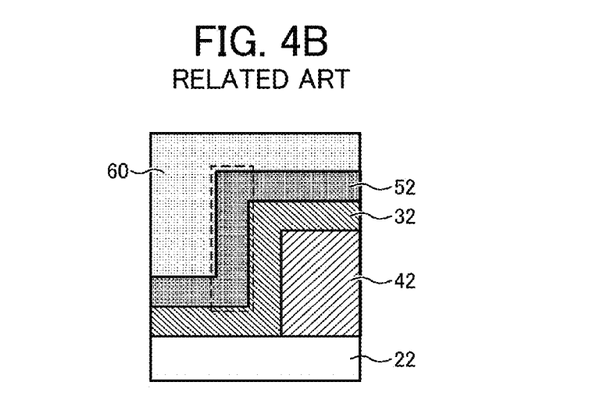
FIG. 4B is a magnified view of the region enclosed by dotted lines in FIG. 4A.

In the case in which the first auxiliary electrode 42 is formed on the first support 22 without being embedded therein, convex portions are formed on the first support 22 with the first auxiliary electrode 2 having certain line thickness and width, as illustrated in FIG. 4A. In particular, the thickness of the electrochromic layer 52 is increased in the vertical direction according to the line thickness of the first auxiliary electrode 42, as illustrated in FIG. 4B (i.e., a magnified view of the region enclosed by dotted lines in FIG. 4A), thereby causing film thickness unevenness of the electrochromic layer 52. Such a film thickness unevenness causes color development unevenness when the electrochromic elements develops color. Since the film thickness unevenness of the electrochromic layer 52 is caused due to the convex portions on the first support 22, color development unevenness can be avoided by removing the convex portions by making the first support 22 and the first auxiliary electrode 42 share a flat surface.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An electrochromic apparatus, comprising:
a first support having a first surface on which a plurality of grooves is formed;
a first electrode disposed at each one of the plurality of grooves of the first support;
a first transparent conductive layer in contact with the first surface of the first support having the first electrode thereon;
an electrochromic layer in contact with the first transparent conductive layer;
a second support having a second surface on which a plurality of grooves is formed, the grooves on the second surface facing the grooves on the first surface;
a second electrode disposed at each one of the plurality of grooves of the second support;
a second transparent conductive layer in contact with the second surface of the second support having the second electrode thereon; and
an electrolyte layer between the electrochromic layer and the second transparent conductive layer.

2. The electrochromic apparatus according to claim 1, wherein the first electrode has a volume resistivity smaller than that of the first transparent conductive layer, and wherein the second electrode has a volume resistivity smaller than that of the second transparent conductive layer.

3. The electrochromic apparatus according to claim 2, wherein the grooves of the first support and the second support have a width in the range of 5 to 50 μm, a depth in the range of 0.5 to 10 μm, and a pitch in the range of 500 to 5,000 μm.

4. The electrochromic apparatus according to claim 2, wherein the grooves are in a linear pattern or a grid pattern.

5. The electrochromic apparatus according to claim 2, wherein the first surface of the first support, facing the electrochromic layer and having the first electrode thereon, has an aperture ratio of 90% or more.

6. The electrochromic apparatus according to claim 1, wherein the grooves of the first support and the second support have a width in the range of 5 to 50 μm, a depth in the range of 0.5 to 10 μm, and a pitch in the range of 500 to 5,000 μm.

7. The electrochromic apparatus according to claim 6, wherein the grooves are in a linear pattern or a grid pattern.

8. The electrochromic apparatus according to claim 6, wherein the first surface of the first support, facing the electrochromic layer and having the first electrode thereon, has an aperture ratio of 90% or more.

9. The electrochromic apparatus according to claim 1, wherein the grooves are in a linear pattern or a grid pattern.

10. The electrochromic apparatus according to claim 9, wherein the first surface of the first support, facing the electrochromic layer and having the first electrode thereon, has an aperture ratio of 90% or more.

11. The electrochromic apparatus according to claim 1, wherein the first surface of the first support, facing the electrochromic layer and having the first electrode thereon, has an aperture ratio of 90% or more.

12. The electrochromic apparatus according to claim 1, wherein each of the first support and the second support includes a transparent resin film.

13. An electrochromic element, comprising:
a first support;
a first electrode layer on the first support;

a second support;

a second electrode layer on the second support, the second electrode layer facing the first electrode layer;

an electrolyte layer between the first electrode layer and the second electrode layer;

an electrochromic layer in contact with the first electrode layer; and a first auxiliary electrode in contact with the first electrode layer and embedded in the first support while forming a flat surface with the first support, the first auxiliary electrode including a material having a resistance lower than that of the first electrode layer.

14. The electrochromic element according to claim 13, wherein an average difference in level between a surface of the first auxiliary electrode and a surface of the first support is 50 nm or less.

15. The electrochromic element according to claim 13, further comprising:

a second auxiliary electrode in contact with the second electrode layer and embedded in the second support while forming a flat surface with the second support, the second auxiliary electrode including a material having a resistance lower than that of the second electrode layer.

16. The electrochromic element according to claim 13, wherein the first auxiliary electrode has an average width in the range of 5 to 50 μm and an average thickness in the range of 0.5 to 10 μm.

17. The electrochromic element according to claim 13, wherein the material included in the first auxiliary electrode is at least one member selected from the group consisting of gold, silver, copper, aluminum, nickel, tin, and carbon.

18. The electrochromic element according to claim 13, wherein each of the first electrode layer and the second electrode layer includes at least one of a conductive oxide, a conductive particle, and a conductive carbon.

19. An electrochromic dimming member, comprising:
the electrochromic element according to claim 13.

20. A method of manufacturing an electrochromic element, comprising:

forming a plurality of recesses on at least one of a first surface of a first support and a second surface of a second support, the first surface and the second surface facing with each other;

forming an auxiliary electrode at each one of the recesses;

flattening the first surface or the second surface having the auxiliary electrode on which an electrochromic layer is formed; and forming an electrolyte layer between the electrochromic layer and one of the first surface and the second surface.

* * * * *